United States Patent [19]

Fischbach

[11] Patent Number: 5,452,788
[45] Date of Patent: Sep. 26, 1995

[54] DEVICE TO FACILITATE THE TRANSPORT OF BUNCHES OF BANANAS AT THE TIME OF THEIR HARVEST

[75] Inventor: Gerard Fischbach, Juniville, France

[73] Assignee: Fischbach SaRL, France

[21] Appl. No.: 122,459

[22] PCT Filed: Feb. 1, 1993

[86] PCT No.: PCT/FR93/00106

§ 371 Date: Sep. 24, 1993

§ 102(e) Date: Sep. 24, 1993

[87] PCT Pub. No.: WO93/15000

PCT Pub. Date: Aug. 5, 1993

[30] Foreign Application Priority Data

Jan. 30, 1992 [FR] France .................................. 92 01189

[51] Int. Cl.⁶ .................................................. B65G 17/32
[52] U.S. Cl. .................................................. 198/681; 414/528
[58] Field of Search ........................... 198/678.1, 681, 198/803.14; 414/528, 679

[56] References Cited

U.S. PATENT DOCUMENTS

| | | |
|---|---|---|
| 2,651,759 | 9/1953 | Lamont et al. . |
| 2,658,610 | 11/1953 | Winslow ............................. 198/681 X |
| 2,997,190 | 8/1961 | Reed ....................................... 414/528 |
| 3,115,977 | 12/1963 | Mirando . |
| 3,557,939 | 1/1971 | Lyons ................................... 198/681 X |

FOREIGN PATENT DOCUMENTS

| | | |
|---|---|---|
| 0089744 | 6/1967 | France . |
| 2531918 | 2/1984 | France . |
| 2651759 | 3/1991 | France ............................... 198/678.1 |
| 0153006 | 7/1987 | Japan ..................................... 198/681 |
| 0550100 | 6/1974 | Switzerland . |

Primary Examiner—James R. Bidwell
Attorney, Agent, or Firm—Lerner, David, Littenberg, Krumholz & Mentlik

[57] ABSTRACT

A device for transporting banana bunches includes two substantially horizontal slides supported by a platform. The slides are formed with first and second interconnected levels of moving tracks receiving a purality of pairs of rollers. Each pair of rollers is interconnected by a cross-bar, so that each pair of rollers moves laterally and passes from the first level to the second level and visa versa. A purality of shock absorber units are anchored to each cross-bar. Arrangements for hanging the banana bunches are situated between the shock absorber units.

11 Claims, 2 Drawing Sheets

DEVICE TO FACILITATE THE TRANSPORT OF BUNCHES OF BANANAS AT THE TIME OF THEIR HARVEST

The purpose of this invention is a device to facilitate the transport of bunches of bananas after their harvest.

Bananas are fragile fruits and it is necessary to take multiple precautions to transport them.

The unsuitability of current means of transport of bananas generates considerable loss, specifically during transport from the plantation to the place of sorting and packaging.

This invention aims to remedy these problems by proposing a device for transporting bunches of bananas, which has a simple design and is simple to use.

The device for transporting bunches of bananas covered under the invention is adapted onto a harnessable trailer, with flexible suspension of the axle and of the shaft.

It has lateral vertical posts which, at their top, support two slides, one on each side, parallel to the platform, with a U-shaped cross-section, creating two grooves facing each other.

These slides are bent like a hairpin, curved parts toward the rear of the trailer, so as to create two parallel levels of sliding in the same vertical plane.

Between these two slides there are regularly spaced crossbars, each of which are equipped, at their end, with loose rollers that roll in the grooves of said slides, and anchored to chains that are connected to a drive device, moved by motorization or manually.

Thus the crossbars can roll by their ends in the U-shaped grooves and pass from one level to the other.

These crossbars support regularly spaced rods, to the end of each of which is anchored a shock-absorber block made of a flexible material, of the foam or polyurethane type.

Secondly, between two successive rods, anchored to the crossbar, there is a means of hanging a bunch of bananas.

The device according to the invention is used as follows: the crossbars all being, at the start, on the upper level of the slides, and the carrier rods of the shock-absorber blocks directed upward, the first crossbar is brought to the lower level of the slides, and the shock-absorber blocks that it supports then teeter, coming into vertical position under said crossbar. Then the second crossbar is brought into the curvature of the slides, its shock-absorber blocks being then in horizontal position; then bunches of bananas are hung from the hooks of this crossbar. When all hooks of this crossbar are loaded, the chains are advanced, which firstly brings the shock-absorber blocks of said crossbar against the bunches that have just been hung and which are thus placed between two rows of shock-absorber blocks, and secondly places the next crossbar in the curvature of the slides, with shock-absorber blocks horizontal, and so forth.

Advantageously, the carrier rods of the shock-absorber blocks are telescopic so as to occupy less space when they are in standby position on the top of the trailer.

The advantages and the characteristics of this invention will be more clearly understood from the following description, which refers to the attached drawing, which illustrates one non-restrictive way of realizing it.

In the attached drawing:

FIG. 1b is a cross-section view according to the axis XX' shown in FIG. 1a.

Figure 1B:
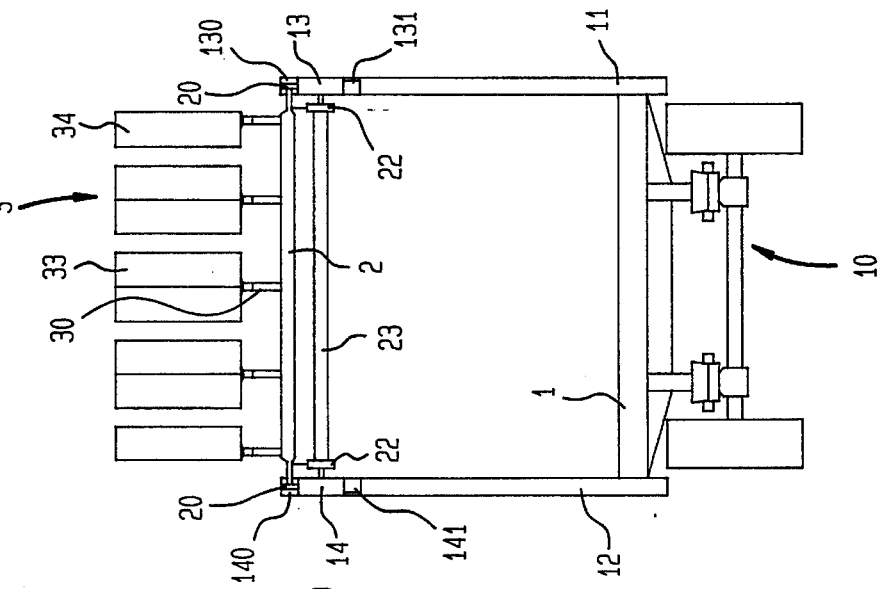
Figure 1A:
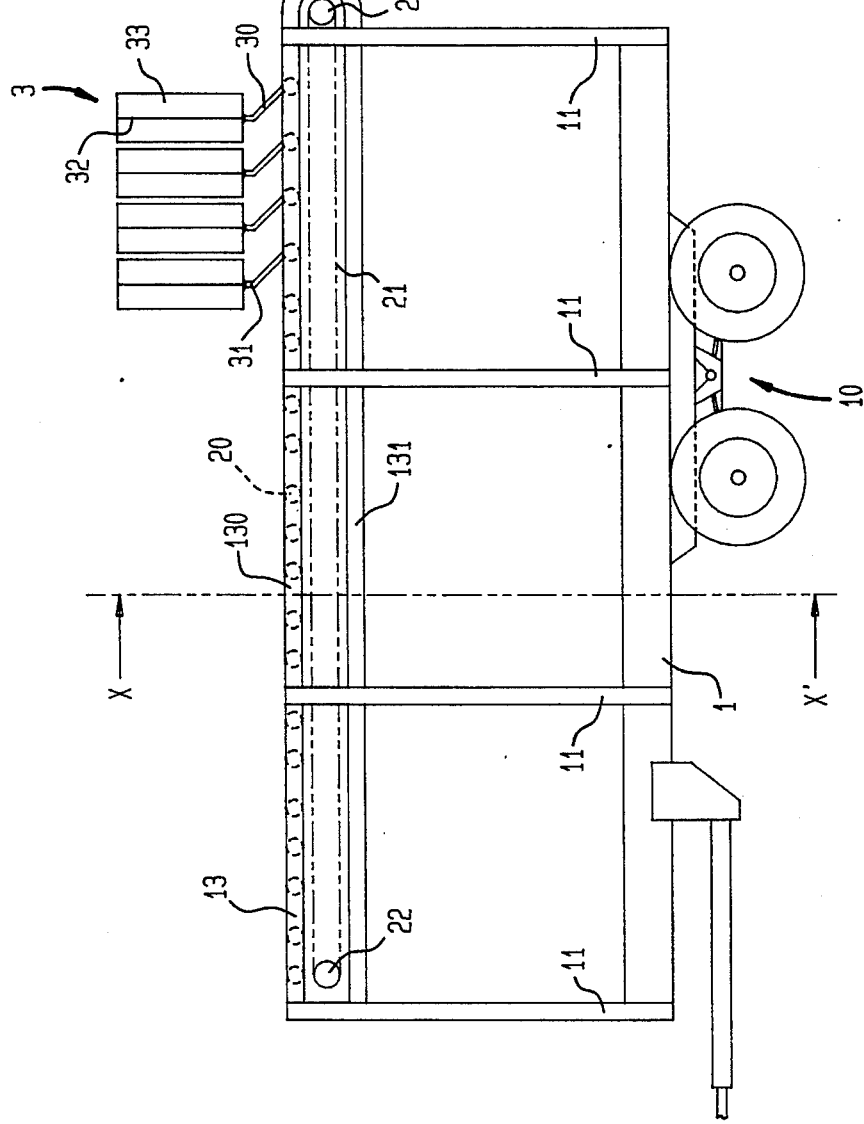
FIG. 1a is a profile view of the device according to the invention.

If we refer to FIG. 1a and 1b, we can see that the device according to the invention is accommodated on a platform 1 mounted on a rolling undercarriage 10, and that it has, anchored to this platform 1 through vertical posts 11 and 12, slides 13 and 14 that face each other.

These slides 13 and 14 have a U-shaped transverse cross-section and are bent like a hairpin, thereby creating, for each of them, two parallel rolling tracks 130 and 131, respectively 140 and 141.

Into these slides 13 and 14 the ends are engaged, equipped with loose rollers 20, crossbars 2, anchored to chains 21 stretched between cogwheels 22 arranged at the two ends of the slides 13 and 14 and connected to each other, two by two, by axes 23, the chains 21 being parallel to the slides 13 and 14 and mobile in translation either manually or by motorization, thereby making it possible to have the crossbars 2 pass, one after the other, at a determined speed, from the rolling tracks 130 and 140 to the rolling tracks 131 and 141, and vice versa.

Figure 2:
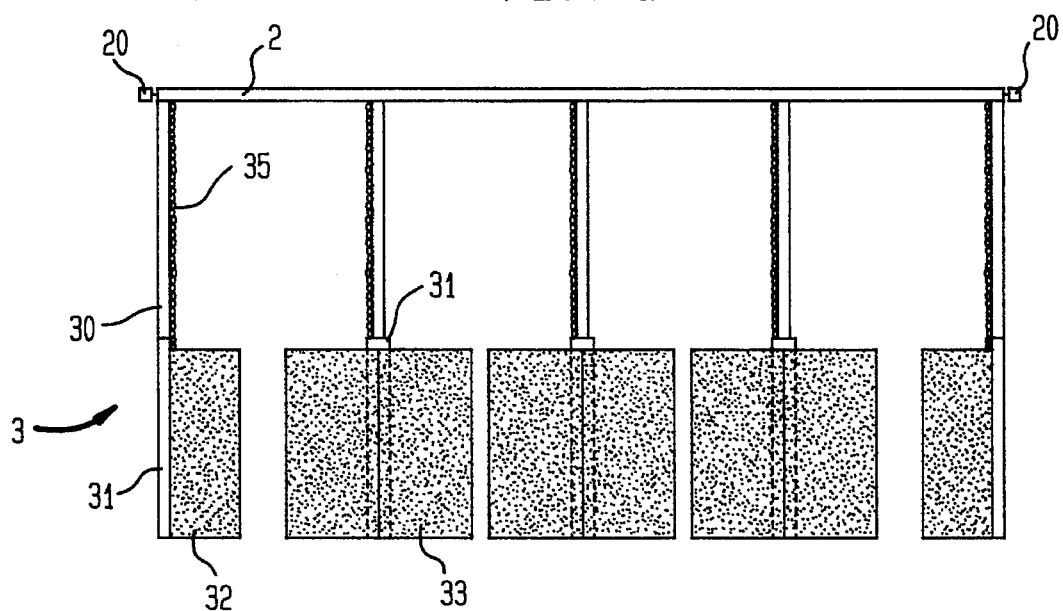
FIG. 2 is a partial view, from the front, of a row of shock-absorber blocks hung from a crossbar of the device according to the invention.

If we refer also to FIG. 2, we can see that each crossbar 2 has shock-absorber units 3, each comprised of a sliding mounted rod 30 in a pipe 31 onto which is anchored a metal plate 32 positioned cross-wise with respect to the platform 1.

Onto the metal plates 32 are anchored, on either side, shock-absorber blocks 33, e.g. made of foam or polyurethane, with a triangular cross-section, to form together a block with an approximate diamond shape, the diagonals of which are parallel to the sides of the platform.

The shock-absorber units 3 of the ends of the crossbars 2 have plates 32 that are half-sized in the direction of the width, to which are anchored shock-absorber blocks 34, whose similar shape is the shape of a shock-absorber block 33 which would have been cut according to its height.

Similarly, the plates 32 of the shock-absorber units 3 of the end crossbars 2 are equipped with shock-absorber blocks 33 only on one side.

The rods 30 are bent, and anchored by their top end to the crossbars 2, such that, when a shock-absorber unit 3 hangs under a crossbar 2 and the plate 32 is in vertical position, its axis does not pass through the crossbar 2 but is behind it.

When the crossbars 2 are in the upper rolling tracks 130 and 140, the plates 32 are in vertical position above the slides 13 and 14, and the pipe 31 slides over the rod 30 up to its bend.

When a crossbar is passing from the upper level to the lower level 2, the pipe 31 slides over the rod 30. A chain 35 of specific length limits this sliding and makes it possible to position the shock-absorber blocks 33 at the appropriate height.

Figure 4:
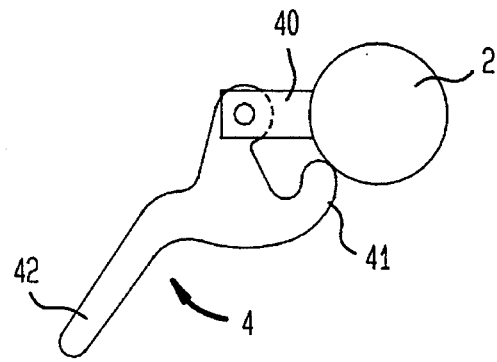
FIG. 4 is a partial profile view of a means of hanging a bunch of bananas.

If we also refer to FIG. 4, we can see that the means for hanging 4 a bunch of bananas has, firstly, a foot 40 anchored radially to a crossbar 2, between two rods 30, not visible in the figure. At the end of the leg 40, can pivot, by one of its ends, a crescent-shaped hook 41, while the other end can, due to the pivoting, come into contact with the crossbar 2. The hook 41 is inserted into an opening in the upper end of the trunk of the bunch of bananas, its weight causing the device to lock; the bunch is unhooked by raising a handle 42 attached to the hook 41.

Figure 3:
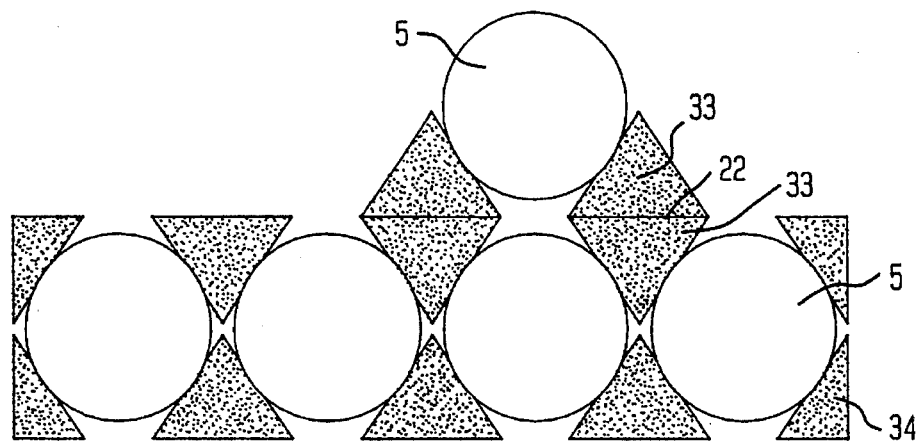
FIG. 3 is a partial schematic view, seen from above, of bunches of bananas arranged between the shock-absorber blocks.

If we refer now to FIG. 3, we can see that the bunches of bananas 5 are all hung housed between the shock-absorber blocks 33 or 34 and that they thereby cannot be damaged during their transport.

The bunches of bananas are unloaded by doing the opposite manoeuvres, i.e. by having the crossbars 2 pass from the lower level to the upper level; the bunches 5 are unhooked at the rear of the trailer when the shock-absorber units are in horizontal position, the hook 41 opening by pivoting under the weight of the bunch.

It goes without saying that this invention cannot be limited to the preceding description of one method of its realization, which can undergo some modifications without thereby departing from the framework of the invention.

I claim:

1. A device for transporting banana bunches, comprising
   a platform,
   two slides supported by said platform and positioned substantially horizontally, said slides forming first and second interconnected levels of rolling tracks;
   a plurality of pairs of rollers movably supported within said rolling tracks, rollers in each said pair of rollers being interconnected by a cross-bar, each said pair of rollers moving laterally within said slides and passing from said first level to said second level and from said second level to said first level;
   a plurality of shock absorber units anchored to each said cross-bar; and
   a plurality of arrangements for hanging said banana bunches, each said arrangement situated between said shock absorber units.

2. The device of claim 1, wherein said slides are connected to said platform by substantially vertical posts.

3. The device of claim 2, wherein said cross-bars and the rollers are moved by a chain driven by cogwheels.

4. The device of claim 1, wherein said platform is a movable platform.

5. The device of claim 4, wherein said movable platform a part of a trailer.

6. The device of claim 1, wherein each said shock absorber unit comprises a rod having an end, said rod is anchored to said cross-bar at said end, a substantially cylindrical hollow body slidably positioned on said rod, a plate attached to said substantially cylindrical body and a shock absorber block being connected to said plate.

7. The device of claim 6, wherein said plate is formed with two sides and said shock absorber unit is a central shock absorber unit having said shock absorber block positioned at each side of said plate, each said shock absorber block is of a substantially triangular cross-section, so that said shock absorber unit is shaped as a diamond having one of its diagonals positioned substantially parallel to sides of said platform.

8. The device of claim 6, further comprising each said crossbar formed with two ends, a peripheral shock absorber unit is positioned at each said end of the cross-bar, said peripheral shock absorber unit having a plate receiving a said shock absorber block.

9. The device of claim 8, wherein said shock absorber block of each said peripheral shock absorber unit has a substantially triangular cross-section approximately corresponding to a half of the cross-section of said shock absorber blocks of each said central shock absorber unit and said central shock absorber units are positioned between the peripheral shock absorber units.

10. The device of claim 1, wherein slidable motion of each said shock absorber unit on said rod is limited by a restricting member.

11. The device of claim 10, wherein said restricting member is a chain having one of its ends attached to the cross-bar and another end attached to said substantially cylindrical hollow member.

* * * * *

UNITED STATES PATENT AND TRADEMARK OFFICE
CERTIFICATE OF CORRECTION

PATENT NO.   : 5,452,788
DATED        : September 26, 1995
INVENTOR(S)  : Gerard Fischbach It is certified that error appears in the above-indentified patent and that said Letters Patent is hereby corrected as shown below:

Column 3, line 36, before "a part" insert --forms --.

Signed and Sealed this

Ninth Day of January, 1996

Attest:

BRUCE LEHMAN

Attesting Officer                Commissioner of Patents and Trademarks